July 27, 1954 H. L. BARNEY 2,685,066

IMPEDANCE INVERSION NETWORKS

Filed April 12, 1951 2 Sheets-Sheet 1

$$e_1 = Z_{11}\, i_1 + Z_{12}\, i_2$$
$$e_2 = Z_{21}\, i_1 + Z_{22}\, i_2$$
$$Z_{in} = Z_{11} - \frac{Z_{12}\, Z_{21}}{Z_{22} + Z_t}$$

$$Z_{in} = \frac{Z_g^2}{R}$$

INVENTOR
H. L. BARNEY
BY Harry C. Hart
ATTORNEY

IMPEDANCE INVERSION NETWORKS

Filed April 12, 1951 2 Sheets-Sheet 2

INVENTOR
H. L. BARNEY
BY Harry C. Hart
ATTORNEY

Patented July 27, 1954 2,685,066

UNITED STATES PATENT OFFICE 2,685,066

IMPEDANCE INVERSION NETWORKS

Harold L. Barney, Madison, N. J., assignor to Bell Telephone Laboratories, Incorporated, New York, N. Y., a corporation of New York Application April 12, 1951, Serial No. 220,598

7 Claims. (Cl. 333—11)

This invention relates to electric circuits and has for its principal object the inversion of impedances, i. e., the provision of an effective impedance whose magnitude is inversely related to that of an impedance element to which it is connected.

It is well known that when a quarter wavelength transmission line whose characteristic impedance is $Z_o$ is terminated in an impedance $Z_t$, the input impedance of the combination is given by $$Z_{in}=\frac{Z_o^2}{Z_t} \qquad (1)$$

Thus, the quarter wave line "inverts" the impedance $Z_t$ as seen at the input terminals of the line. This action takes place only at the frequency for which the length of the line is ¼, ¾, 5/4, etc., of the wavelength and is thus a very narrow-band action. Moreover, utilization of such a line as a circuit element is necessarily restricted to frequencies so high that the required length of the line is not excessive in relation to other component elements of the circuit. It is plain that if a device were available whose action were like that of the quarter wave line without restriction of band width or of frequency range, it would be useful in many different circumstances, providing the circuit designer with a new building block in addition to the resistors, condensers, inductances, and transformers to which he is normally restricted.

The conditions which a four-terminal network must satisfy in order that it shall operate as an impedance inverter may be succinctly defined. Starting with the classic defining equations of any four-terminal network having input voltage and current $e_1$, $i_1$ and output voltage and current $e_2$, $i_2$, namely, $$\begin{aligned} e_1&=Z_{11}i_1+Z_{12}i_2 \\ e_2&=Z_{21}i_1+Z_{22}i_2 \end{aligned} \qquad (2)$$

where $Z_{11}$ and $Z_{22}$ are the self-impedances of the first and last meshes, $Z_{12}$ and $Z_{21}$ being the corresponding mutual impedances; and when this network is loaded at its output terminals with a terminating impedance $Z_t$ then, as is well known, the impedance of the combination as seen at the input terminals is given by $$Z_{in}=Z_{11}-\frac{Z_{12}Z_{21}}{Z_{22}+Z_t} \qquad (3)$$

When, in such a network, the following conditions are satisfied, namely, $$\begin{aligned} Z_{11}&=0 \\ Z_{22}&=0 \\ -Z_{12}Z_{21}&=Z_g^2 \end{aligned} \qquad (4)$$

where $Z_g$ is any number, positive or negative, real, imaginary, or complex, then (3) reduces to $$Z_{in}=\frac{Z_g^2}{Z_t} \qquad (5)$$

which evidently has the same form as (1) and describes the impedance inversion process.

In an article published in Philips Research Reports for 1948, page 81, (Vol. 3), B. D. H. Tellegen has discussed the possibilities which would be opened up to the circuit designer if there were available to him a circuit element which he has chosen to name a "gyrator." He defines this element as a four-pole network having the properties $$\begin{aligned} Z_{11}&=0 \\ Z_{22}&=0 \\ Z_{12}&=-Z_{21} \end{aligned} \qquad (6)$$

These restrictions are narrower than those of Equations 4, and by the same token the gyrator, which may be termed a symmetrical impedance inverter, not only acts to invert an impedance to which it is connected, but does so equally well in either direction. It also has other interesting properties. It will be shown below that any of the impedance-inverting networks of the invention can be converted into a gyrator by imposing on it the restrictions of Equations 6 instead of those of Equations 4.

Accordingly, it is a particular object of the invention to construct a gyrator.

The invention is based upon the recognition that if, in the combination of an electric circuit which feeds energy to a load to which it is connected, the energy reflected by the load is fed back in reverse phase to the input terminals, there to be combined with the energy of the source, the impedance presented by the combination is reduced as the load impedance increases, and vice versa. This thought is implemented by the provision, between a source and a receiver of impedance $Z_t$, of a forward path which conveys energy of the source to the receiver, preferably without either gain or loss, means for separating the energy absorbed by the receiver from the energy reflected by it, a second path by way of which the reflected component is fed back to the input terminals of the apparatus, with a reversal of phase but preferably without either gain or loss, and means for separating this feedback energy from the original energy so that only the energy which is generated in or reflected by the source can enter the first path, the feedback energy being excluded from it. The separating or sorting means may conveniently comprise a balanced biconjugate network such as a hybrid coil or a double bridge, the two energy paths being connected, at each end of the system, to two of the conjugate terminal pairs of the biconjugate network, while of the remaining two conjugate terminal pairs one pair serves as input terminals or output terminals for the network as a whole, and the other is connected to a balancing impedance element. Inasmuch as the ideal hybrid produces a loss of 3 decibels for each passage through it, while the action outlined above involves two such passages through each of two such hybrids, then, to maintain the condition of zero overall gain or loss, one or more amplifiers are included which together provide gains in the two paths whose sum is 12 decibels or a factor 4. In the case of a symmetrical gyrator having two amplifiers, the gain furnished by each is 2; i. e., when it works into a matched impedance, its voltage amplification factor is 4. But it is only necessary that the resultant gain due to whatever amplifiers there may be shall be equal to the losses due to all causes, including the sorting or separating networks. When, for example, doubly balanced resistance bridges are employed as the separating networks in place of hybrids, then the sum of the losses is 24 decibels or a factor 16, and this is compensated by one or more amplifiers which provide a gain of 16 which may be divided equally or unequally among them as desired.

In the networks of the invention, the inverting impedance $Z_g$ has the value $$Z_g=\sqrt{Z_{N_1}Z_{N_2}} \qquad (7)$$

where $Z_{N_1}$ and $Z_{N_2}$ are the magnitudes of the balancing impedances which, as in other situations, are employed with the hybrids. In the special case in which they are alike, i. e., when $$Z_{N_1}=Z_{N_2} \qquad (8)$$

then $$Z_g=Z_N \qquad (9)$$

and the inverting impedance is equal to either one of them. This relation, together with others to be discused below, furnishes one approach to the reduction of the impedance inverter to a gyrator. That these results shall hold, certain relations between the impedances at the various parts of the system are necessary. These, however, are well known in the telephone repeater art and are easily satisfied.

It follows from Equations 5 and 7 not only that the invention inverts a large terminating impedance into a small input impedance and vice versa but also that the constant of proportionality or inverting impedance $Z_g$ is under the control of the designer. Thus, for example, an effective large inductive reactance may be produced from the combination of the gyrator with a comparatively small condenser. Such an arrangement results in substantial savings both of space and of cost.

The invention is not restricted to ideal impedance inverters or gyrators, small departures from this ideal construction resulting in correspondingly small departures from ideal performance, while certain of them in addition produce valuable new results. Thus, for example, if the net gain of the reflection feedback system is made slightly more than enough to overcome the losses of its networks, then a reactance element having unavoidable dissipation connected to its output terminals is not only inverted in magnitude but also appears as a substantially pure reactance, i. e., it is greatly improved in its "Q."

The invention will be fully apprehended from the following detailed description of certain preferred embodiments thereof taken in connection with the appended drawings, in which.

Figure 10:
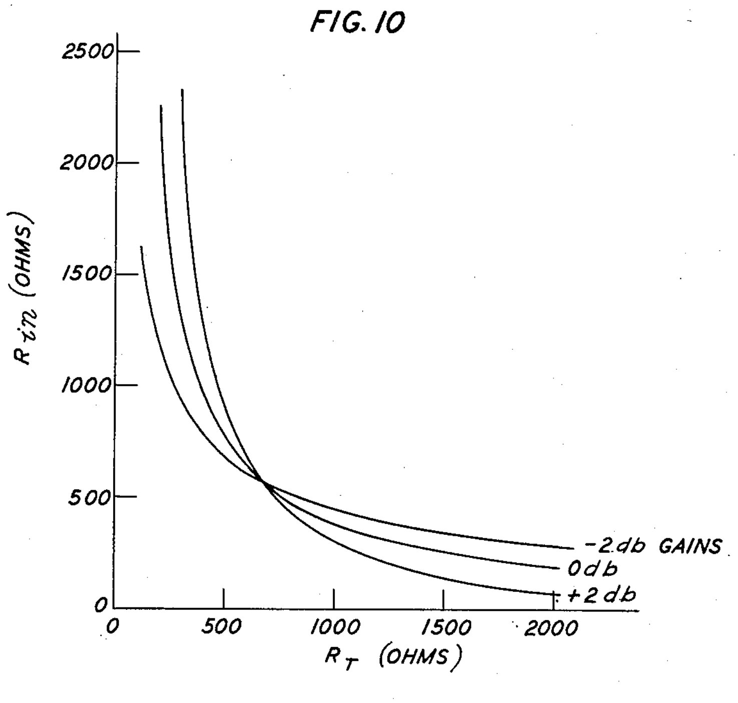

Figs. 6, 7, 8, and 9 illustrate the inversion of impedances of various types with the help of the inverter of the invention; and Fig. 10 is a family of curves illustrating the impedance-inverting action of the invention in various of its forms.

Figure 1:
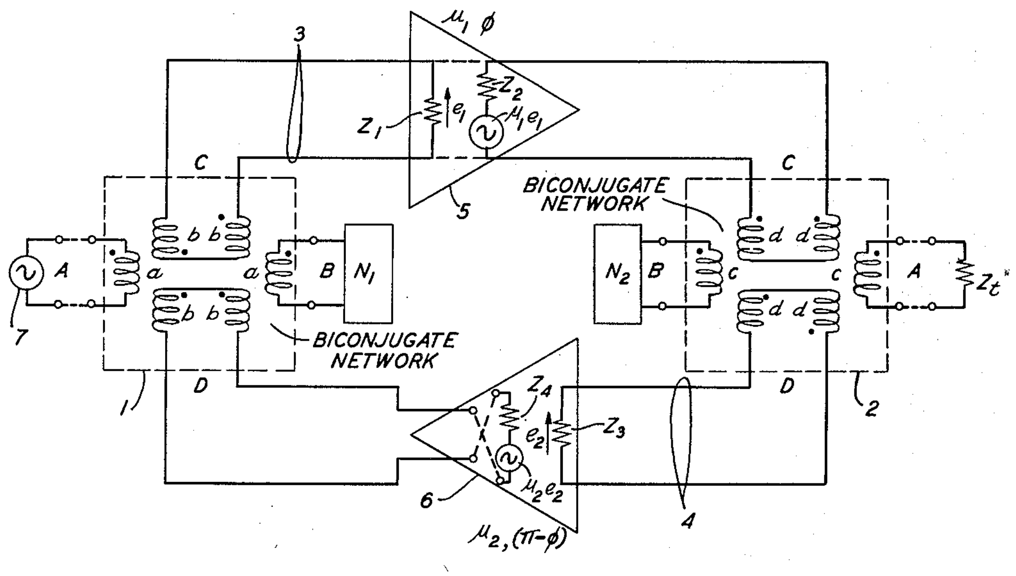
Fig. 1 is a schematic circuit diagram showing an impedance inverter network in accordance with the invention.

Referring now to the drawings, Fig. 1 shows a four-terminal network comprising a first biconjugate network 1 to which input terminals A are connected, a second biconjugate network 2 to which output terminals A are connected, a first path 3 arranged to carry energy only from the first biconjugate network to the second, and a second path 4 arranged to carry energy only from the second biconjugate network to the first. The unilateral character of these paths is indicated by the inclusion of a one-way amplifier 5 in the upper path and another one-way amplifier 6 in the lower path. The left-hand terminals of the upper path 3 are connected to the terminals marked C of the left-hand biconjugate network 1, while the left-hand terminals of the lower path 4 are connected to the terminals marked D of the same network, the terminal pairs C and D being conjugate to each other. Similarly, the right-hand terminals of the upper path 3 are connected to the C terminals of the right-hand biconjugate network 2, while the right-hand terminals of the lower path 4 are connected to its D terminals. Here again, the C terminals are conjugate to the D terminals. Each biconjugate network also has A terminals and B terminals. The A terminals of the left-hand network are the input terminals of the inverting network as a whole and are connected to a source 7. The A terminals of the right-hand network are the output terminals of the inverting network as a whole and are connected to a terminating impedance element $Z_t$. The B terminals are connected in each case to a balancing impedance element $N_1$ for the left-hand network 1 and $N_2$ for the right-hand one 2. The impedance of this balancing element is in each case preferably equal to the mean value of the impedance of the line which is connected to the A terminals of the same network and to the amplifier impedances which face it, i. e., the input impedance of one amplifier and the output impedance of the other. The polarities of the various windings of the two biconjugate networks 1, 2 are indicated on the drawing by the convention of black dots, one located at one end of each winding. Their placement is to be understood as indicating that when a signal voltage is applied to an input winding with a sign such that the dotted end of the input winding is positive, the resulting induced voltage is likewise positive at that end of each output winding which is provided with the black dot. As in the case of a 22-type repeater, when the windings are poled in this fashion and when, in addition, the impedance of the balancing element $N_1$ is equal to the impedance of the source, then source energy appearing at the input terminals A divides equally between the C terminals and the D terminals. Similarly, at the right-hand end of the network, when the windings are similarly poled and when the impedance of the balancing element $N_2$ is equal to the impedance seen looking out of the right-hand terminals, then energy appearing at these terminals, as, for example, due to reflection by the impedance of a receiver, divides equally between the C terminals and the D terminals. In the case of each such division, the energy entering one branch meets the output terminals of a one-way amplifier and is blocked, while the energy entering the other branch meets the input terminals of an amplifier and passes through to the other biconjugate network. This energy division in the case of any hybrid network involves a power loss of 3 decibels. Therefore, when energy applied at the left-hand A terminals divides between the left-hand C and D terminals, the former fraction passing through the upper path to the right-hand biconjugate network and dividing between the balancing element $N_2$ and the right-hand A terminals, and when, in turn, a fraction of the latter is returned by reflection at the receiver impedance to divide again, the fraction entering the lower path returning to the left-hand biconjugate network and a fraction of this, in turn, to the input A terminals, two passages through each of two biconjugate networks have been involved with a resulting loss of 12 decibels or a factor 4. Since, in accordance with the invention in one of its ferred forms, it is desirable that the impedance inverter have a net insertion gain or loss of zero decibels, the losses in the hybrid networks are to be compensated by equal and opposite gains, which are conveniently provided by the amplifiers 5, 6 in the upper and lower paths. When these are symmetrically distributed, each may provide a net gain of 2, or a total of 4, although in general it is not necessary that the gains be symmetrically distributed in the two paths. Stated in other terms, the product $\mu_1$, $\mu_2$ of the amplification factors of the two amplifiers, working into matched loads, should be 16. This is because one half of the output of each amplifier is necessarily absorbed in its own output impedance.

Furthermore, in accordance with the invention, and in order that the network of Fig. 1 shall operate as an impedance inverter, it is necessary that the total change of phase of a signal transmitted around the whole loop in the manner described above shall be an odd multiple of $\pi$ radians. This is specifically illustrated in Fig. 1 by the inclusion of a transposition of the conductors within the lower amplifier 6 and of a direct transmission path within the upper amplifier. In general, however, the necessary change in phase around the loop may be divided among the branches in any desired way. For example, a reversal of the polarity of one of the hybrid windings would serve the same purpose as the transposition shown. This is generally illustrated by the legends $\phi$ and $\pi-\phi$ as the phase shifts produced in the upper path 3 and in the lower path 4, respectively.

That the network of Fig. 1 operates to invert a terminating impedance in accordance with Equation 5 may be seen qualitatively from the following considerations:

Suppose, first, that the terminating impedance $Z_t$ has its mean value, i. e., it is equal to the impedance $Z_{N_2}$ of the balancing element $N_2$. Because the right-hand biconjugate network is in this case balanced, there is no transmission across it from its C terminals to its D terminals; and except for the hybrid losses discussed above, all of the energy of the source 7 which is applied at the input A terminals reaches the receiver impedance $Z_t$. Since this is equal to the balancing impedance $N_2$, there is no reflection at the right-hand A terminals and, therefore, no input to the amplifier in the lower path. Under these conditions, the impedance seen at the input A terminals is simply that of the input hybrid network when its C terminals are connected to an impedance equal to the input impedance of the upper amplifier 5 and its D terminals are connected to an impedance equal to the output impedance of the lower amplifier 6.

Suppose next that the terminating impedance $Z_t$ is replaced by a short circuit at the output A terminals. The right-hand hybrid network 2 is now unbalanced so that of the energy which reaches the load $Z_t$ by way of the upper path 3, all of it is reflected by the short-circuit termination and returns to the right-hand A terminals to divide again. It re-enters, furthermore, with a phase determined by the reflection at the receiver. It is well known that at a discontinuity between an impedance $Z_R$ and another impedance $Z_t$, the voltage reflection coefficient is given by the expression $$R_e=\frac{Z_t-Z_R}{Z_t+Z_R} \tag{10}$$

If the impedance of the network looking back to the right-hand A terminals to be taken as $Z_R$, then, since when the output A terminals are short-circuited $Z_t=0$, this expression shows that the reflection takes place with a reversal of phase. The reflected energy now divides again at the right-hand hybrid network 2, and the fraction entering the lower path 4 is again reversed in phase, thus restoring it to its original phase condition so that when, after another division at the input hybrid network 1, it is combined with the input energy from the source 7, this combination takes place in additive relation. It follows that replacing the load on the right-hand terminals by a short circuit results in an increase of the input voltage for a given current so that while the terminating impedance has been reduced, the apparent input impedance of the network as a whole has been increased.

Third, suppose the load to be replaced by an open circuit. If the energy is followed from the input terminals through the input hybrid network 1, the upper path 3, and the right-hand hybrid network 2 to the output terminals and the reflected energy is similarly followed back through the lower path 4, including both the output hybrid network 2 and the input hybrid network 1, then, referring again to the voltage reflection coefficient (10), it is seen that the reflection at the open circuit takes place without change of phase, while the transposition of the conductors in the lower amplifier 6 effects a phase reversal so that when the reflected energy is combined with the input energy, the combination takes place in a subtractive fashion, thus reducing the input voltage for any given current. As a consequence, the increase of the load impedance $Z_t$ from a value which matches the balancing element $N_2$ has resulted in a reduction of the input impedance of the inverter network as a whole, as seen at its input A terminals.

Figure 2:
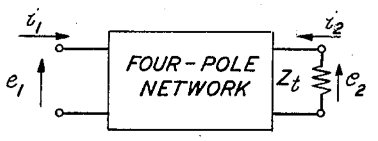
Fig. 2 is an illustrative diagram of assistance in the analysis of the performance of Fig. 1.

To see that the action of the network of Fig. 1 is to invert the impedance of its load not only qualitatively but quantitatively as well, it is necessary to resort to analysis. Referring to Fig. 2, which shows a generalized four-pole network having input terminals to which a voltage $e_1$ is applied resulting in an input current $i_1$ flowing inward, output terminals to which is connected a terminating impedance or load $Z_t$ which supports a voltage $e_2$ by reason of the flow through it of a current $i_2$, then, as is well known, such a network may always be described by Equations 2 and 3, which are reproduced below the figure and at this point of the specification for ready reference.

$$\begin{aligned} e_1 &= Z_{11}i_1 + Z_{12}i_2 \\ e_2 &= Z_{21}i_1 + Z_{22}i_2 \end{aligned} \qquad (2)$$

$$Z_{in} = Z_{11} - \frac{Z_{12}Z_{21}}{Z_{22}+Z_t} \qquad (3)$$

If the complete circuit equations for Fig. 1 are set down and solved, the following expressions for the four-pole impedances of Equations 2 result:

$$Z_{11} = Z_{N_1}\frac{\left[1+\frac{Z_4}{Z_1}+\frac{Z^4}{n_1^2Z_{N_1}}\right]\left[1+\frac{Z_2}{Z_3}+4\frac{n_2^2Z_{N_2}}{Z_3}\right]+\mu_1\mu_2}{\left[1+\frac{Z_4}{Z_1}+4\frac{n_1^2Z_{N_1}}{Z_1}\right]\left[1+\frac{Z_2}{Z_3}+4\frac{n_2^2Z_{N_2}}{Z_3}\right]-\mu_1\mu_2} \qquad (11)$$

$$Z_{12} = -2\mu_2\frac{n_2}{n_1}Z_{N_2}\;\frac{1+2\frac{n_1^2Z_{N_1}}{Z_1}}{1+2\frac{n_2^2Z_{N_2}}{Z_3}}\;\frac{1+\frac{Z_2}{Z_3}+2\frac{n_2^2Z_{N_2}}{Z_3}+\frac{1}{2}\frac{Z_2}{n_2^2Z_{N_2}}}{\left[1+\frac{Z_4}{Z_1}+4\frac{n_1^2Z_{N_1}}{Z_1}\right]\left[1+\frac{Z_2}{Z_3}+4\frac{n_2^2Z_{N_2}}{Z_3}\right]-\mu_1\mu_2} \qquad (12)$$

$$Z_{21} = -2\mu_1\frac{n_1}{n_2}Z_{N_1}\;\frac{1+2\frac{n_2^2Z_{N_2}}{Z_3}}{1+2\frac{n_1^2Z_{N_1}}{Z_1}}\;\frac{1+\frac{Z_4}{Z_1}+2\frac{n_1^2Z_{N_1}}{Z_1}+\frac{1}{2}\frac{Z_4}{n_1^2Z_{N_1}}}{\left[1+\frac{Z_4}{Z_1}+4\frac{n_1^2Z_{N_1}}{Z_1}\right]\left[1+\frac{Z_2}{Z_3}+4\frac{n_2^2Z_{N_2}}{Z_3}\right]-\mu_1\mu_2} \qquad (13)$$

$$Z_{22} = Z_{N_2}\frac{\left[1+\frac{Z_2}{Z_3}+\frac{Z_2}{n_2^2Z_{N_2}}\right]\left[1+\frac{Z_4}{Z_1}+4\frac{n_1^2Z_{N_1}}{Z_1}\right]+\mu_1\mu_2}{\left[1+\frac{Z_4}{Z_1}+4\frac{n_1^2Z_{N_1}}{Z_1}\right]\left[1+\frac{Z_2}{Z_3}+4\frac{n_2^2Z_{N_2}}{Z_3}\right]-\mu_1\mu_2} \qquad (14)$$

In the foregoing equations, the symbols have the following meanings:

$Z_{N_1}$ is the impedance of balancing element $N_1$;

$Z_{N_2}$ is the impedance of balancing element $N_2$;

$n_1$ is the turns ratio of each coil marked *b* of the left-hand biconjugate network 1 to each coil marked *a*;

$n_2$ is the turns ratio of each coil marked *d* of the right-hand biconjugate network 2 to each coil marked *c*;

$Z_1$, $Z_2$, and $\mu_1$ are the input impedance, the output impedance, and the voltage amplification factor, respectively, of the upper amplifier 5;

$Z_3$, $Z_4$, and $\mu_2$ are the input impedance, the output impedance, and the voltage amplification factor, respectively, of the lower amplifier 6. (Because of the transposition of the conductors within the lower amplifier, its voltage amplification factor $\mu_2$ is to be considered as intrinsically negative.)

Consider now the relations $$\sqrt{Z_4Z_1} = 2n_1^2Z_{N_1} \qquad (15)$$

$$\sqrt{Z_3Z_2} = 2n_2^2Z_{N_2} \qquad (16)$$

$$\mu_1\mu_2 = -\left[1+\sqrt{\frac{Z_2}{Z_3}}\right]^2\left[1+\sqrt{\frac{Z_4}{Z_1}}\right]^2 \qquad (17)$$

(Here the minus sign arises from the intrinsically negative nature of $\mu_2$).

If (15), (16), and (17) are substituted in (11) and (14), it is found that the expressions (11) and (14) vanish, so that the first two of Equations 4, the first condition of an impedance inverter, are satisfied. Moreover, if (15), (16), and (17) are substituted in (12) and (13), the latter reduce to $$Z_{12} = \frac{-\mu_2}{\sqrt{-\mu_1\mu_2}}\frac{n_2}{n_1}Z_{N_2} \qquad (18)$$

$$Z_{21} = \frac{-\mu_1}{\sqrt{-\mu_1\mu_2}}\frac{n_1}{n_2}Z_{N_1} \qquad (19)$$

Multiplying (18) and (19) together gives $$Z_{12}Z_{21} = -Z_{N_1}Z_{N_2} \qquad (20)$$

Since no restriction was imposed on the inversion constant $Z_g$ of Equations 4, it is at once seen that Equation 20 is the full equivalent of the third condition of Equations 4 and that, therefore, the network of Fig. 1, subject to the conditions (15), (16), and (17), does in fact operate to invert the impedance of a load which is connected to its right-hand A terminals.

If, in addition to these restrictions, the parameters of Fig. 1 are also constrained to satisfy the relation $$\sqrt{\frac{Z_3Z_2}{Z_4Z_1}} = \frac{\mu_2}{\mu_1}\frac{Z_{N_2}}{Z_{N_1}}\frac{n_2^2}{n_1^2} = \frac{Z_{12}}{Z_{21}} = -1 \qquad (21)$$

then the network of Fig. 1 satisfies the requirements of (6) and so becomes that special form of impedance inverter which is known as a gyrator.

Figure 3:
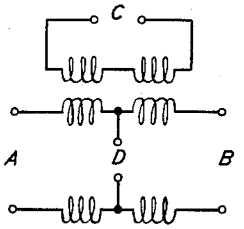
Fig. 3 is a schematic circuit diagram showing an alternative to either of the hybrid networks of Fig. 1.

The foregoing analysis has been carried out in connection with Fig. 1, in which the biconjugate networks are exemplified by hybrid coils of a well-known but special configuration. Any of the many different well-known forms of hybrid coil, such, for example, as that of Fig. 3, can serve equally well in carrying out the invention, and an equivalent analysis would, in each case, lead to equations which are the counterparts of Equations 15, 16, and 17, although not identical in form. Thus, for example, the factors $2n_1^2$ and $2n_2^2$ in Equations 15 and 16 apply specifically to the hybrid networks of Fig. 1; and if another hybrid were to be substituted, a different factor would appear in the equivalent restrictive equations.

Figure 4:
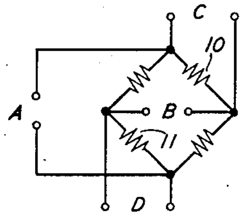
Figs. 4 and 5 are schematic diagrams of two alternative biconjugate networks employing resistance bridges.

Aside from the substitution of one hybrid for another, a doubly balanced resistance bridge can also serve as the biconjugate network. Fig. 4 shows such a doubly balanced bridge of four resistances. For the sake of specific illustration, the A or line terminals are connected to the vertical diagonal of the bridge, and the B or balancing net terminals are connected to the horizontal diagonal of the bridge which is conjugate to the former. The C terminals, which in Fig. 1 lead to the input of the upper amplifier 5, are connected to one resistor 10, while the D terminals, which in Fig. 1 lead to the output of the lower amplifier 6, are connected to the other resistor 11. The remaining two resistors are included to complete the balance. If such a configuration is employed and if the resistors are of the order of a few hundred ohms in magnitude, they may all be made alike, the input impedance of the upper amplifier and the output impedance of the lower amplifier being made very large by comparison, so that their shunting effects on the resistors of the bridge are negligible. If it is desired to employ larger resistors or input and output amplifier impedances which are smaller, it is only necessary to increase somewhat the magnitudes of the two shunted resistors to compensate for the shunting action of the amplifier terminals so that the bridge remains balanced in operation.

On the other hand, it is equally possible to arrange, for the input bridge network, that the input impedance $Z_1$ of the upper amplifier 5 shall itself constitute one of the bridge resistors, and the output impedance $Z_4$ of the lower amplifier 6 shall itself constitute the other. This results in the configuration of Fig. 5. For balance, it is, of course, necessary that the magnitudes of the input impedance $Z_1$ of the upper amplifier 5 of the output impedance $Z_4$ of the lower amplifier 6 be appropriately proportioned in relation to the magnitudes of the balancing resistors. A corresponding proportionment of resistors and amplifier impedances holds for the configuration of Fig. 5 when employed as the left-hand biconjugate network.

Figure 5:
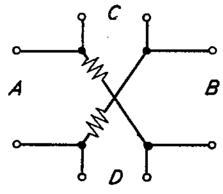

When the detailed circuit equations for an impedance inverter which employs resistance bridges, as shown in Fig. 4 or Fig. 5 or otherwise, are set down and when, in turn, they are conditioned in accordance with Equations 4, three defining equations, which are the counterparts of Equations 15, 16, and 17 result. These are different in detail from Equations 15, 16, and 17 but are unchanged in the general sense that they require a first relation between the impedance of the left-hand balancing element $N_1$ and the geometrical mean between the amplifier input and output impedances which are connected to the left-hand biconjugate network, a second relation between the impedance of the right-hand balancing element and the geometrical mean between the amplifier impedances which are connected to the right-hand biconjugate network, and a third relation between the product of the two amplification factors and the four amplifier impedances. This last relation always includes the required phase shift of an odd multiple of $\pi$ radians for both passages through the entire network, represented in Fig. 1 by a transposition of conductors and in Equation 17 by a minus sign, and it also contains implicitly the requirement that the amplifier gains shall in the case of the ideal inverter just compensate for all losses.

The network of Fig. 1 thus carries out the impedance inversion operation defined, from Equations 5 and 7, by $$Z_{in}=\frac{Z_g^2}{Z_t}=\frac{Z_{N_1}Z_{N_2}}{Z_t} \qquad (22)$$

and may be put to use in many different ways. Suppose, for example, a physical impedance element which varies about an average value $Z_a$ being available, it is desired to construct a network whose impedance varies inversely with that of the available element and about a different average value $Z_b$. The available element may be connected to the A terminals at the right-hand end of the inverting network where it serves as the terminating impedance $Z_t$. The impedances of the balancing elements $N_1$ and $N_2$ may be made alike and each one equal to the geometrical mean between $Z_a$ and $Z_b$. It is preferable, however, from certain standpoints having to do with impedance match at the two ends of the inverting network to make the balancing elements $N_1$ and $N_2$ unlike; in particular, to make $$Z_{N_1}=Z_a$$

$$Z_{N_2}=Z_b$$

With this adjustment, the source impedance and the receiver impedance both vary in operation about the balance values of their respective biconjugate networks.

Figure 6:
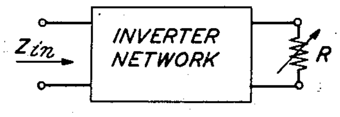
Figure 7:
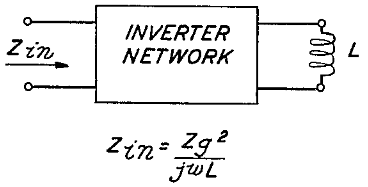
Figure 8:
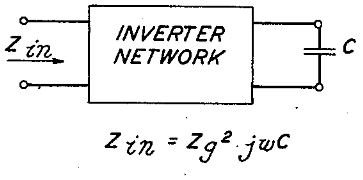
Figure 9:
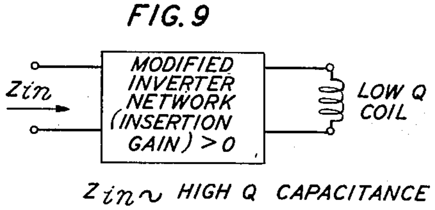

Figs. 6, 7, and 8 illustrate this situation for the cases of a resistance R, a condenser C, and an inductance L as the terminating impedance. As shown, inversion of a reactance changes its character as well as its magnitude.

The balancing impedance elements are not necessarily resistances, and certain advantages follow from making one or both of them reactive or complex. Thus, suppose the two balancing elements to be alike and each to be a pure reactance. In this case $$Z_{N_1}=Z_{N_2}=j\omega L \qquad (23)$$

where L is the magnitude of the inductance, and the input impedance of Equation 22 reduces to $$Z_{in}=\frac{-\omega^2L^2}{Z_t} \qquad (24)$$

Thus, the input impedance is a negative quantity which varies inversely with the terminating impedance. If the latter is resistive, the input impedance becomes negative and real. If, on the other hand, the terminating impedance is reactive, then the input impedance likewise becomes reactive and contains a term involving either the first power or the third power of the frequency, depending on whether the termination is inductive or capacitive.

Suppose, on the other hand, that the network $N_1$ is an inductive reactance, while the network $N_2$ is a resistance, i. e., $$Z_{N_1}=j\omega L \qquad (25)$$

$$Z_{N_2}=R_1 \qquad (26)$$

Then, from Equation 22

$$Z_{in}=\frac{j\omega LR_1}{Z_t} \qquad (27)$$

If now the load $Z_t$ is a pure resistance $R_2$, the input impedance becomes from Equation 27 a pure inductive reactance whose magnitude is proportional to the product of the two balancing impedances and inversely proportional to the resistive load. Such a system is useful in any connection in which an effective reactance is desired which is controllable over a wide range, e. g., as a variable reactance to be employed as a part of the frequency determining or "tank" circuit of a frequency-modulation oscillator. It may further find use as a frequency modulator, one signal being applied to control the magnitude of the network $N_1$ whose impedance is $R_1$ and the other signal, which is to be modulated on the first, being applied to control the magnitude of the terminating impedance $R_2$.

As indicated above, the controlling requirement for exact impedance inverter operation is that there shall be no net gain or loss in a round trip through both paths, including the amplifiers and biconjugate networks. As also indicated above, if conventional hybrids are employed as the biconjugate networks, they introduce a net loss of a factor 4; and to compensate for this loss, the two amplifiers together must introduce a net gain of 4, which, with the further condition that the net phase change, in the same round trip, must be equal to an odd multiple of $\pi$ radians, leads to the requirement of Equation 16.

From Equations 15 and 16, it is seen that the impedance presented to the C terminals of either of the biconjugate networks need not be equal to the impedance presented to the D terminals. Rather, the balancing element connected to this network is equal to the geometrical mean of these two impedances modified by the factor $2n^2$, where $n$ is the turns ratio which relates the windings of the network. In the case of a common form of biconjugate network, namely, that shown in Fig. 1, the turns ratio is equal to $$\frac{1}{\sqrt{2}}$$

so that this factor reduces to unity.

However, there is little or no advantage as a practical matter in making these various impedances unlike, and advantages of ease in design and construction follow from making them all alike, i. e., $$Z_1=Z_2=Z_3=Z_4=Z$$

in which case $$Z=2n_1^2Z_{N_1}=2n_2^2Z_{N_2}$$

Furthermore, when the input and output impedances of the two amplifiers are proportioned in this fashion, then $$\sqrt{\frac{Z_2}{Z_3}}=1$$

and $$\sqrt{\frac{Z_4}{Z_1}}=1$$

so that Equation 17 reduces to $$-\mu_1\mu_2=16 \qquad (28)$$

In a symmetrical impedance inverter, it is convenient to employ amplifiers which are alike except for reversal of the leads in one of them. Thus, in the symmetrical case discussed above $$\mu_1=4$$
$$\mu_2=-4 \qquad (29)$$

However, this is not necessary, and Equation 28 may be satisfied in various ways, e. g., $$\mu_1=16$$
$$\mu_1=-1 \qquad (30)$$

which represents a situation in which all the gain is furnished in the upper path, the lower path furnishing merely the phase reversal. Or again $$\mu_1=160$$
$$\mu_2=-\tfrac{1}{10} \qquad (31)$$

which represents more than the necessary amount of gain in the upper path and a compensatory loss accompanied by the necessary phase reversal in the lower path. In each case, as long as the restriction imposed by Equation 17 is adhered to, the apparatus operates as an impedance inverter with the following exception.

In the foregoing development, it has been assumed that the upper path transmits only in one direction and the lower path only in the opposite direction. If, therefore, a passive network having no gain but rather an appropriate amount of loss be substituted for the amplifier of the lower path, then the foregoing analysis fails to hold in so far as this passive network transmits in both directions. But if, as indicated for example by Equations 31, the loss in the lower path be fairly large, being compensated by a large gain in the upper path, the consequences of this bi-lateral character of the lower path are not serious.

However the gains may be distributed as between the upper and the lower path, the product of the voltage amplification factors must be kept at the value −16 for an ideal impedance inverter. But the invention is not restricted to the ideal situation, and valuable consequences result from certain departures from this ideal, for example, a departure from the requirement of Equation 28. Thus, consider Fig. 9, where the terminating element is a coil having distributed losses and operated at such a frequency that its complex impedance is given by $$Z_t=29.3+j600 \qquad (32)$$

This coil has a Q factor of about 20. Suppose this coil to be connected as the load on a modified impedance inverter in which the amplifier input and output impedances and the balancing impedances are all alike and equal to 600 ohms, i. e., $$Z_1=Z_2=Z_3=Z_4=Z_{N_1}=Z_{N_2}=600 \text{ ohms}$$

while the turns ratios among the coils of the hybrids have their most usual values $$n_1=n_2=\frac{1}{\sqrt{2}}$$

Suppose now that the gain of one of the amplifiers be slightly increased over the value required to exactly compensate the losses. Specifically, let $$\mu_1=4.0$$
$$\mu_2=-4.2$$

If the values given above are substituted in Equation 3, the result is $$Z_{in}=-14.65-\frac{(585)(615)}{-14.65+29.3+j600} \qquad (33)$$

Evaluation of Equation 33 gives $$Z_{in} = -j600 \quad (34)$$

or a pure capacitive reactance of infinite Q. Thus, a very small increase in the loop gain resulting from an increase in the product of the amplification factors of the amplifiers from the value given for the ideal general case by Equation 17 and for the ideal symmetrical case by Equation 28 to the value −16.8 has resulted in a great improvement in the Q of the terminating impedance element as seen through the inverter.

A number of other such examples have been tested with resistive loads and the results have been plotted as curves in Fig. 10. Here, the center curve marked "0 db" is that for an ideal inverter in which the amplification factors satisfy Equation 28. It is an equilateral hyperbola showing the true reciprocal relation between the terminating impedance and the effective input impedance to the inverter. When the overall gain is increased by 2 decibels, the steeper curve results, while when it is reduced by 2 decibels, the shallower curve results. Evidently, the relations discussed in Fig. 5, while they depart from the exact reciprocal relation furnished by the ideal inverter, may in some cases be of even greater value.

The requirement of a total phase shift around the feedback loop which is an odd multiple of $\pi$ radians is illustrated in Fig. 1 for the sake of simplicity by a simple transposition of the leads in the lower amplifier. It is thus the same for all frequencies. It is possible to substitute for this simple cross-over a more elaborate arrangement giving a phase shift which is frequency-dependent. To take a single example, a phase shift may be introduced whose value is zero below some preassigned frequency and $\pi$ radians for all frequencies above it. Networks are known which have phase characteristics closely approximating this. If such a phase-shifting network were employed in place of the lead transposition of the lower amplifier of Fig. 1, the impedance inverting action of the network would come into play at this frequency and would hold for all higher frequencies, while for lower frequencies the network would act merely as a transformer; i. e., it would act to alter the effective magnitude of the terminating impedance without performing the inversion operation.

While the networks of the invention have been described both structurally and functionally as impedance inverters, it is to be borne in mind that in many cases the restrictions of Equation 21 may be imposed on the amplifier gains, the balancing impedances, and the hybrid turns ratios without sacrifice and that whenever this is done, any of these networks satisfies Equations 6 as well as Equations 4 and so operates not only as an impedance inverter but as a gyrator for all purposes.

What is claimed is:

1. A bilateral transmission device having at each of two opposite ends thereof a biconjugate network having a pair of line terminals connected thereto, two independent transmission paths interconnecting conjugate terminals of said networks, one of said paths transmitting in only one direction and the other of said paths transmitting in only the other direction without interaction between said paths, the phase shifts individual to said paths being such that the sum of the phase shifts in the two directions of transmission, measured between said two pairs of terminals, is an odd multiple of $\pi$ radians, the gains of said paths being adjusted to give, for the device as a whole, an insertion loss of zero decibels.

2. An impedance inverter which comprises a first network having line terminals and two conjugate pairs of additional terminals, a second network having line terminals and two conjugate pairs of additional terminals, a first unidirectional energy path interconnecting the first additional terminal pair of the first network with that of the second network, a second unidirectional energy path interconnecting the second additional terminal pair of the first network with that of the second network, the direction of transmission of energy along said paths being additive in one direction around the loop composed of said networks and said paths, the total phase shift of said transmission being an odd multiple of $\pi$ radians, and the total gain of said transmission being of the order of unity.

3. An impedance inverter which comprises two biconjugate networks each of which has first conjugate terminals A, B, and second conjugate terminals C, D, the A terminals of each network constituting line terminals of the inverter, a first balancing element connected to the B terminals of the first network, a second balancing element connected to the B terminals of the second network, the C terminals of the first network being connected by way of a first unidirectional energy path to the C terminals of the second network, said first path transmitting only in one direction and with a particular phase shift, the D terminals of the first network being connected by way of a second unidirectional energy path to the D terminals of the second network, said second path transmitting only in the other direction and with a phase shift which when added to the phase shift of said first path gives an odd multiple of $\pi$ radians, the gain of each of said paths being such that the network as a whole has an insertion loss of zero decibels.

4. Apparatus as defined in claim 3 wherein each of said biconjugate networks comprises a hybrid coil.

5. Apparatus as defined in claim 3 wherein each of said independent paths contains an amplifier.

6. Apparatus as defined in claim 3 wherein the gain factor of each of said amplifiers has the value 4.

7. In combination with an energy source and a terminating impedance element, an impedance inverter which comprises an input network having input terminals for connection to said source, an output network having output terminals connected to said impedance element, a unidirectional path for conveying energy of said source without phase reversal from said input terminals through said networks to said output terminals, whereby a fraction of said energy is absorbed by said impedance element while another fraction is reflected back from said elements to said output terminals with a polarity dependent on the magnitude of said impedance element, means for selecting said reflected energy fraction, a second unidirectional path for conveying energy with phase reversal from said output terminals through said networks to said input terminals, there to be combined with said input energy, means for applying to said second path said selected reflected energy fraction, and means for preventing application to said first path of energy transmitted by way of said second path except as it is first combined with said source energy, the transmission gain around the loop comprising said two paths and said two networks being of the order of unity, whereby said reflected energy fraction appears at said input terminals with a magnitude and phase such that the effective input impedance at said input terminals is reciprocally related to said terminating impedance element.

References Cited in the file of this patent

UNITED STATES PATENTS

| Number | Name | Date |
|---|---|---|
| 1,504,135 | Nyquist | Aug. 5, 1924 |
| 1,815,838 | Dolmage | July 21, 1931 |
| 1,863,566 | Dolmage | June 21, 1932 |